(12) United States Patent
Herron et al.

(10) Patent No.: US 8,557,415 B2
(45) Date of Patent: Oct. 15, 2013

(54) BATTERY PACK VENTING SYSTEM

(75) Inventors: Nicholas Hayden Herron, San Francisco, CA (US); Scott Ira Kohn, Redwood City, CA (US); Weston Arthur Hermann, Palo Alto, CA (US); Andrew Hill Leutheuser, Sunnyvale, CA (US); Jeffrey C. Weintraub, San Carlos, CA (US); Dustin Grace, San Carlos, CA (US); Bruce Philip Edwards, Menlo Park, CA (US); Nicolas Verzeni, Palo Alto, CA (US); Joseph Mardall, San Francisco, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 0 days.

(21) Appl. No.: 13/475,955

(22) Filed: May 19, 2012

(65) Prior Publication Data
US 2012/0231306 A1 Sep. 13, 2012

Related U.S. Application Data

(63) Continuation-in-part of application No. 13/076,003, filed on Mar. 30, 2011, now Pat. No. 8,268,469, which is a continuation-in-part of application No. 12/798,198, filed on Mar. 30, 2010, now Pat. No. 8,277,965, which is a continuation-in-part of application No. 12/386,684, filed on Apr. 22, 2009.

(60) Provisional application No. 61/426,254, filed on Dec. 22, 2010.

(51) Int. Cl.
*H01M 2/12* (2006.01)
*H01M 2/08* (2006.01)
*H01M 2/02* (2006.01)
*H01M 10/50* (2006.01)
*B60K 1/04* (2006.01)

(52) U.S. Cl.
USPC ............... 429/53; 429/82; 429/163; 429/185; 180/65.1

(58) Field of Classification Search
USPC ........... 429/53, 82, 163, 185, 54, 56, 57, 148; 320/147; 180/65.1
See application file for complete search history.

(56) References Cited

U.S. PATENT DOCUMENTS 2,094,329 A 9/1937 Mascuch
3,166,446 A 1/1965 Hutchison
(Continued)

FOREIGN PATENT DOCUMENTS

CN 201 732 847 2/2011
EP 0 068 837 1/1983
(Continued)

*Primary Examiner* — Kenneth Douyette
(74) *Attorney, Agent, or Firm* — Patent Law Office of David G. Beck

(57) ABSTRACT

A thermal management system is provided that minimizes the effects of thermal runaway within a battery pack. The system is comprised of a sealed battery pack enclosure configured to hold a plurality of batteries, where the battery pack enclosure is divided into a plurality of sealed battery pack compartments. The system also includes a plurality of battery venting assemblies, where at least one battery venting assembly is integrated into each of the sealed battery pack compartments, and where each of the battery venting assemblies includes an exhaust port integrated into an outer wall of the battery pack compartment and a valve, the valve being configured to seal the exhaust port under normal operating conditions and to unseal the exhaust port when at least one of the batteries within the battery pack compartment enters into thermal runaway.

21 Claims, 11 Drawing Sheets

(56) References Cited

U.S. PATENT DOCUMENTS

| | | |
|---|---|---|
| 3,201,284 A | 8/1965 | Ellis |
| 3,834,945 A | 9/1974 | Jensen |
| 4,482,613 A | 11/1984 | Turchan et al. |
| 4,804,593 A | 2/1989 | Hara et al. |
| 5,227,260 A * | 7/1993 | Rose et al. ............... 429/54 |
| 5,800,942 A * | 9/1998 | Hamada et al. ............ 429/148 |
| 6,278,259 B1 * | 8/2001 | Kimoto et al. ............. 320/147 |
| 6,300,003 B1 * | 10/2001 | Misra et al. ............... 429/100 |
| 2003/0070706 A1 | 4/2003 | Fujioka |
| 2005/0029986 A1 | 2/2005 | Morgan |
| 2005/0170238 A1 | 8/2005 | Abu-Isa et al. |
| 2006/0068278 A1 | 3/2006 | Bloom et al. |
| 2007/0178377 A1 | 8/2007 | Kim et al. |
| 2008/0050645 A1 | 2/2008 | Kai et al. |
| 2008/0220321 A1 | 9/2008 | Yonemochi et al. |
| 2008/0241644 A1 | 10/2008 | Crowe et al. |
| 2008/0318121 A1 | 12/2008 | Takagi |
| 2009/0068549 A1 * | 3/2009 | Hamada et al. ............ 429/56 |
| 2009/0081531 A1 * | 3/2009 | Yoda ........................ 429/57 |
| 2009/0220850 A1 | 9/2009 | Bitsche et al. |
| 2010/0136404 A1 | 6/2010 | Hermann et al. |
| 2010/0178552 A1 | 7/2010 | Kim et al. |
| 2010/0183910 A1 | 7/2010 | Nishino et al. |
| 2011/0027632 A1 | 2/2011 | Higashino et al. |

FOREIGN PATENT DOCUMENTS

| | | |
|---|---|---|
| EP | 2 161 768 A1 | 3/2010 |
| JP | 2004039358 A | 2/2004 |
| JP | 2006185894 | 7/2006 |
| WO | WO 2005122294 A1 | 12/2005 |

* cited by examiner

BATTERY PACK VENTING SYSTEM

CROSS-REFERENCE TO RELATED APPLICATION

This application is a continuation-in-part of U.S. patent application Ser. No. 13/076,003, filed 30 Mar. 2011, now U.S. Pat. No. 8,268,469, which is a continuation-in-part of U.S. patent application Ser. No. 12/798,198, filed 30 Mar. 2010, now U.S. Pat. No. 8,277,965, which is a continuation-in-part of U.S. patent application Ser. No. 12/386,684, filed 22 Apr. 2009, the disclosures of which are incorporated herein by reference for any and all purposes. U.S. patent application Ser. No. 13/076,003, filed 30 Mar. 2011, now U.S. Pat. No. 8,268,469, claims the benefit of the filing date of U.S. Provisional Patent Application Ser. No. 61/426,254, filed 22 Dec. 2010, the disclosure of which is incorporated herein by reference for any and all purposes.

FIELD OF THE INVENTION

The present invention relates generally to batteries and, more particularly, to means for mitigating the effects and hazards associated with a battery undergoing thermal runaway.

BACKGROUND OF THE INVENTION

Batteries come in a wide variety of types, chemistries and configurations, each of which has its own merits and weaknesses. Among rechargeable batteries, also referred to as secondary batteries, one of the primary disadvantages is their relative instability, often resulting in these cells requiring special handling during fabrication, storage and use. Additionally, some cell chemistries, for example lithium-ion secondary cells, tend to be more prone to thermal runaway than other primary and secondary cell chemistries.

Thermal runaway occurs when the internal reaction rate of a battery increases to the point that more heat is being generated than can be withdrawn, leading to a further increase in both reaction rate and heat generation. Eventually the amount of generated heat is great enough to lead to the combustion of the battery as well as materials in proximity to the battery. Thermal runaway may be initiated by a short circuit within the cell, improper cell use, physical abuse, manufacturing defects, or exposure of the cell to extreme external temperatures.

During the initial stages of a thermal runaway event, the cell undergoing runaway becomes increasingly hot due to the increased reaction rate and the inability of the system to withdraw the heat at a rapid enough rate. As the temperature within the cell increases, so does the pressure. While the safety pressure release vent built into many cells may help to release some of the gas generated by the reaction, eventually the increased temperature in concert with the increased internal cell pressure will lead to the formation of perforations in the cell casing. Once the cell casing is perforated, the elevated internal cell pressure will cause additional hot gas to be directed to this location, further compromising the cell at this and adjoining locations.

While the increase in cell temperature during a thermal runaway event is sufficient to damage materials in proximity to the event and to lead to the propagation of the event to adjoining cells, it is not until the hot gas escapes the confines of the cell, and potentially the confines of the battery pack, that the risk to people and property damage is significant. This is because while the event is confined, the gas generated by the event is primarily composed of carbon dioxide and hydrocarbon vapors. As a result, the autoignition temperature (AIT) of combustible materials in proximity to the event is relatively high. However, once this gas exits the confines of the cell/battery pack and comes into contact with the oxygen contained in the ambient atmosphere, the AIT of these same materials will decrease significantly, potentially leading to their spontaneous combustion. It is at this point in the event cycle that extensive collateral property damage is likely to occur and, more importantly, that the risks to the vehicle's passengers leaving the vehicle, or to first responders attempting to control the event, becomes quite significant.

Accordingly, it is desirable to delay the escape of hot gas from the cell or cells undergoing thermal runaway for as long as possible, and then to control the point of egress of the hot gas to the ambient environment. The present invention provides a system and method for achieving these goals, thereby limiting collateral damage and the risk to first responders and others.

SUMMARY OF THE INVENTION

The present invention provides a thermal management system for minimizing the effects of thermal runaway occurring within one or more batteries contained within a compartmentalized battery pack. In accordance with the invention, the system is comprised of a sealed battery pack enclosure configured to hold a plurality of batteries, where the battery pack enclosure is divided into a plurality of sealed battery pack compartments and the plurality of batteries are divided among the plurality of sealed battery compartments. Cross-members and a central battery pack member may be used to divide the battery pack enclosure into multiple sealed battery pack compartments. The system also includes a plurality of battery venting assemblies, where at least one battery venting assembly is integrated into each of the sealed battery pack compartments, and where each of the battery venting assemblies includes a valve and an exhaust port integrated into an outer wall of the battery pack compartment, the valve being configured to seal the exhaust port under normal operating conditions and to unseal the exhaust port when at least one of the batteries within the battery pack compartment enters into thermal runaway. The valve is preferably fabricated from an elastomeric material, such as fluorosilicone, and has a cracking pressure in the range of 0.5 to 1.0 psi.

In at least one embodiment, a valve retention carrier is used to hold the valve in place within the exhaust port of the corresponding battery pack compartment. The retention carrier may be fabricated from plastic. Preferably the valve in such a configuration includes a first portion comprised of an exhaust port sealing member, e.g., an umbrella shaped member, and a second portion comprised of a barbed member configured to be captured by an aperture of the retention carrier. The retention carrier may be configured to capture multiple valves corresponding to multiple exhaust ports. The retention member preferably includes a plurality of snap-fit features configured to hold the carrier in place, where the carrier may be designed to be mounted to either the inside surface or the outside surface of the battery compartment. When the retention carrier is mounted to the outside battery compartment surface, preferably the sealing member of the valve seals against an outer surface of the carrier. Additionally, when the retention carrier is mounted to the outside of the battery compartment surface, preferably the carrier is sealed, for example using an o-ring, to the exhaust port.

In at least one embodiment, the system also includes an exhaust guide, for example fabricated from low carbon steel, that is mounted underneath the battery pack and that directs the flow of hot gas and material expelled during thermal runaway to the ambient environment, for example directing the flow of gas and material away from the vehicle in which the battery pack is incorporated. Preferably the exhaust guide includes exhaust ports that are located outboard of the battery venting assemblies, where the exhaust ports are angled away from normal at an angle of between 30 and 60 degrees.

In at least one embodiment, the battery pack enclosure includes a two way pressure equalization valve that has a cracking pressure less than that of the valves used in the battery venting assemblies.

A further understanding of the nature and advantages of the present invention may be realized by reference to the remaining portions of the specification and the drawings.

DESCRIPTION OF THE SPECIFIC EMBODIMENTS

In the following text, the terms "battery", "cell", and "battery cell" may be used interchangeably and may refer to any of a variety of different cell types, chemistries and configurations including, but not limited to, lithium ion (e.g., lithium iron phosphate, lithium cobalt oxide, other lithium metal oxides, etc.), lithium ion polymer, nickel metal hydride, nickel cadmium, nickel hydrogen, nickel zinc, silver zinc, or other battery type/configuration. The term "battery pack" as used herein refers to multiple individual batteries contained within a single piece or multi-piece housing, the individual batteries electrically interconnected to achieve the desired voltage and capacity for a particular application. The term "electric vehicle" as used herein may refer to an all-electric vehicle, also referred to as an EV, a plug-in hybrid vehicle, also referred to as a PHEV, or a non-plug-in hybrid vehicle, also referred to as a HEV, where a hybrid vehicle utilizes multiple propulsion sources one of which is an electric drive system. It should be understood that identical element symbols used on multiple figures refer to the same component, or components of equal functionality. Additionally, the accompanying figures are only meant to illustrate, not limit, the scope of the invention and should not be considered to be to scale.

When a single battery within a battery pack undergoes thermal runaway, the thermal energy generated by the event can have far-reaching consequences. First, due to the increase in temperature and the related release of hot gas and materials, the temperature of other cells within close proximity to the initially affected cell may increase sufficiently to cause them to enter into a state of thermal runaway which, in turn, may lead to other cells entering into thermal runaway. Therefore the initial thermal event may propagate throughout the battery pack, leading to a much larger thermal event within the pack. Second, as the cell or cells within the pack enter into thermal runaway, the associated increase in pressure may lead to a catastrophic failure of the battery pack enclosure. Unless the battery pack enclosure includes one or more failure points that have been designed to fail at a predetermined pressure, the point of failure will be unknown, resulting in increased risk to passengers, by-standers and first responders depending upon where the random failure point occurs. Third, if the temperature of the gas and material escaping from the battery pack is not lowered prior to its release, the ATI of the combustible materials in proximity to the release point may decrease significantly, potentially leading to their spontaneous combustion. Thus if the egress point is located near a passenger, bystander or first responder, the consequences may be disastrous.

Figure 1:
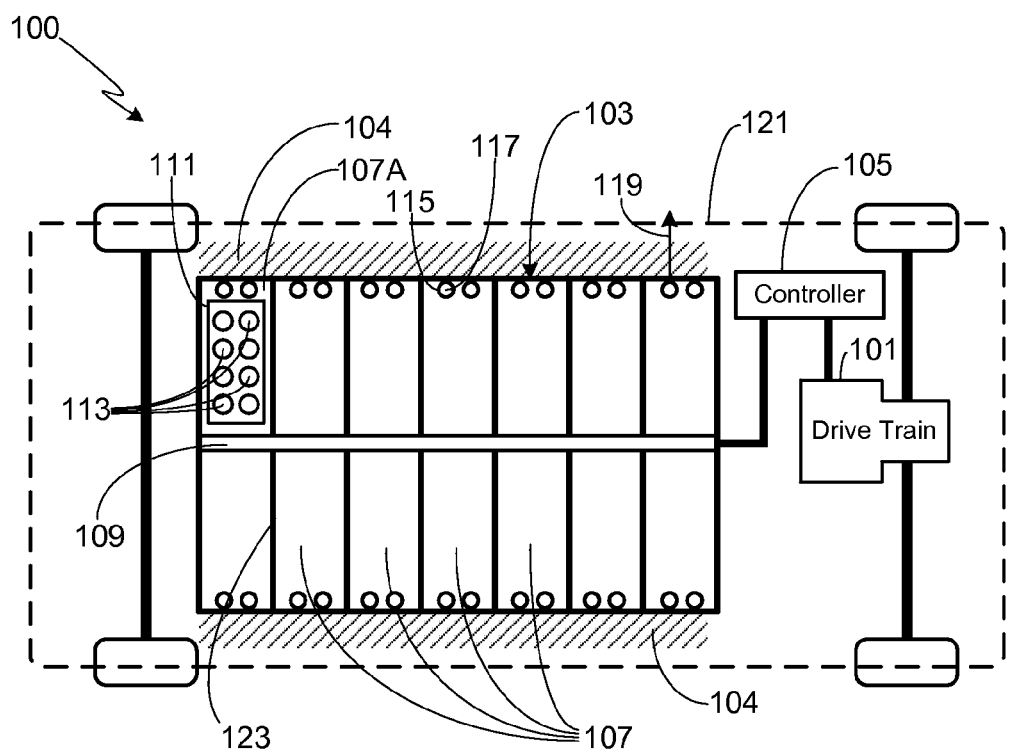
FIG. 1 illustrates the basic elements of a battery pack system designed to control the release of hot gas and material from a thermal event occurring within a portion of the battery pack.

To overcome these problems, and as schematically illustrated in FIG. 1, the present invention controls the location where the hot gas and material accompanying a thermal runaway event is released. Additionally, the invention controls the exchange of thermal energy between regions of the battery pack, thereby helping to prevent a single thermal runaway event from spreading throughout the entire pack and potentially causing catastrophic damage to the vehicle and its surroundings. Although the system is shown implemented in an electric vehicle, i.e., electric vehicle 100, it should be understood that the illustrated concepts and structures may be used with other systems utilizing a large battery pack (e.g., boats, residential or commercial battery systems, etc.). For illustration purposes, the drive system shown in FIG. 1 uses a single electric motor coupled to the drive axle via a transmission/differential assembly, i.e., drive train 101. It will be appreciated that the invention is equally applicable to vehicles using multiple motors coupled to one or both axles. Similarly, the invention is not limited to a specific type/configuration of transmission (e.g., single speed, multi-speed) or a specific type/configuration of differential (e.g., open, locked or limited slip).

Drive train 101 is coupled to battery pack 103 via a power control module 105, module 105 typically including a DC to AC converter. Power control module 105 insures that the power delivered to the electric motor has the desired voltage, current, waveform, etc. As such, power control module 105 may be comprised of passive power devices (e.g., transient filtering capacitors and/or inductors), active power devices (e.g., semiconductor and/or electromechanical switching devices, circuit protection devices, etc.), sensing devices (e.g., voltage, current, and/or power flow sensors, etc.), logic control devices, communication devices, etc.

Battery pack 103, which is preferably mounted to the vehicle's undercarriage 104, is comprised of a plurality of batteries that are segregated into a plurality of battery pack compartments 107. In the pack shown in FIG. 1 there are 14 battery pack compartments 107. Note that a central battery pack member 109, also referred to herein as a battery pack spine, separates the left and right compartments as well as providing a convenient means for running power lines, data lines, etc. Battery pack compartments 107 are sealed from one another, both in terms of thermal energy and gaseous exchange, thus helping to prevent a thermal runaway event occurring within one battery pack compartment from propagating to an adjoining compartment. In at least one embodiment, each battery pack compartment includes a plurality of batteries that are contained within a battery module. Preferably each battery pack compartment includes only a single module, although in some configurations multiple battery modules may be contained within a single battery pack compartment. Compartment 107A illustrates an exemplary module 111 containing multiple individual batteries 113. Preferably each battery compartment includes a similar module(s). Modules 111 are not sealed, but rather designed to 'breath'.

As previously noted, the number of batteries per module, or per battery pack compartment, depends upon the needs of the electric vehicle, the energy density of the individual batteries, etc. The use of battery modules simplifies manufacturing and repair as well as providing a convenient approach to electrically interconnecting the batteries and, in some instances, cooling the batteries. It will be appreciated that the number of batteries within a battery pack compartment 107 and the overall size of the battery pack 103 depends on the energy capabilities of the selected batteries as well as the requirements placed on the batteries by the vehicle or other application.

In accordance with the invention, each battery pack compartment includes one or more gas exhaust ports 115 that are designed to activate during a battery thermal runaway event. Each port 115 is sealed, for example using a valve 117, which prevents contaminants such as road debris and moisture from entering the battery pack, but is designed to open during a thermal runaway event in order to provide a controlled exhaust pathway for the hot gas and materials expelled during runaway. Preferably the battery pack also includes one or more two-way pressure equalization valves (not shown) that have a crack pressure much less than valves 117 (e.g., 0.25 psi versus 0.7 psi for valves 117), thus providing a means for handling pressure differentials due to non-thermal events (e.g., due to thermal gradients and changes in atmospheric pressure).

Sealed ports 115 are mounted near the outer edges of battery pack 103 in order to minimize the length of the exhaust path 119 coupling each exhaust port to the ambient environment falling outside the envelope 121 of the vehicle. Minimizing pathway 119 minimizes the risk of the gas and material expelled during runaway igniting the car which, in turn, lowers the risk to the passengers. Additionally, by including one or more exhaust ports 115 within each battery pack compartment 107 and segregating battery pack compartments using internal battery pack walls 123 (also referred to herein as battery pack cross-members) and central battery pack member 109, the risk of overheating the batteries within other battery compartments 107 is minimized.

During a thermal runaway event, for example one arising in one or more of the illustrated batteries 113 within the front, right battery pack compartment, the gas and material generated by the event easily passes out of the module since the modules, as noted above, are not designed to contain the event, or even prevent moderate pressure changes. As the pressure within the compartment 107 containing the cell undergoing thermal runaway increases, one or more of the valves within that compartment open. Once valve or valves 117 open, the heated gas from the thermal event is exhausted out of the battery pack. In at least one embodiment, each valve and port assembly is designed as a two stage valve that provides increased throughput as the thermal event grows and generates more gas and material. If desired, an exhaust guide may be added, for example mounted to the undercarriage of the vehicle or the underside of the battery pack, which helps to guide the exhausted gas and material away from the vehicle.

Figure 2:
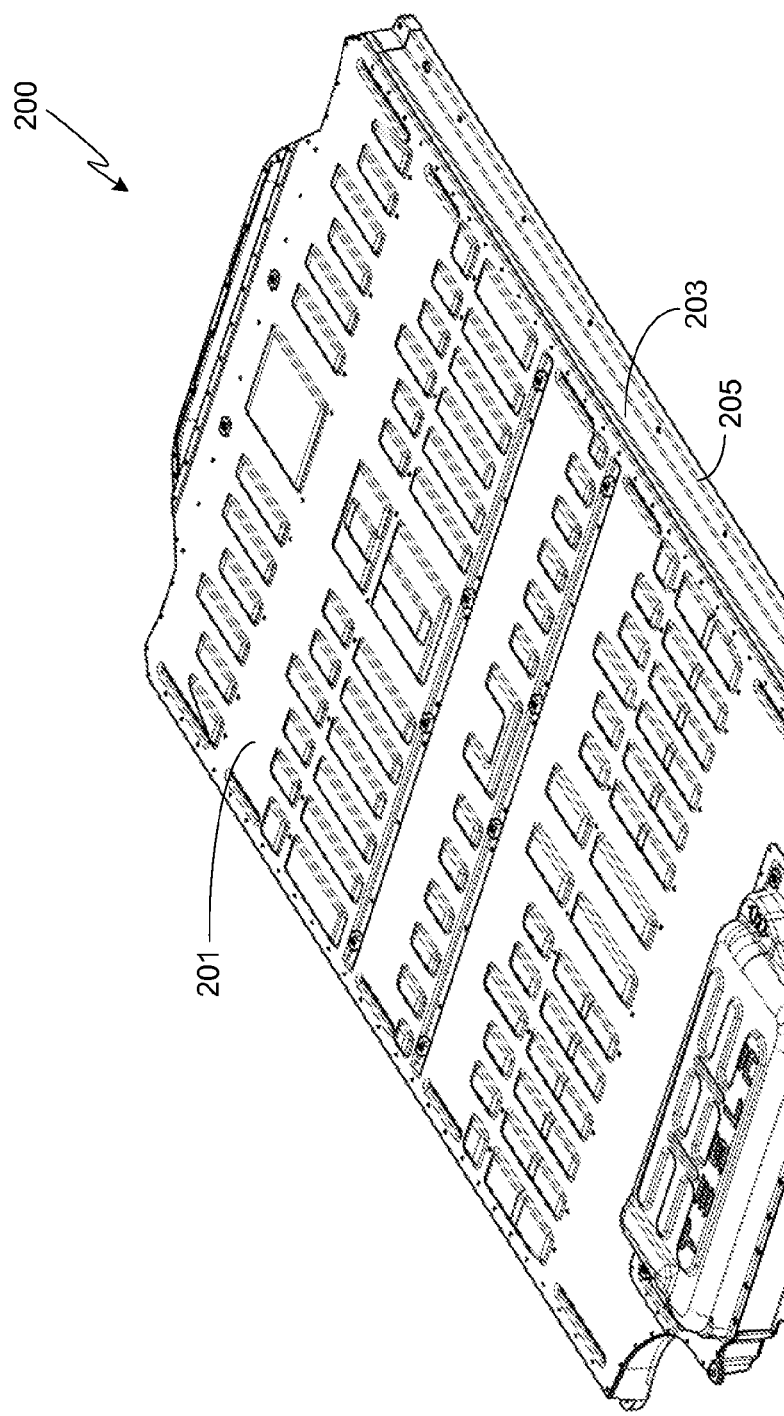
FIG. 2 provides a perspective view of a battery pack in accordance with the invention.

FIG. 2 provides a perspective view of a battery pack 200 in accordance with the invention. In this view, the battery pack is shown closed by a top member 201. Preferably side structural members 203 include an extended region or lip 205 which is used to mechanically and thermally couple the side members 203, and thus the battery pack, to the vehicle structure (not shown).

Figure 3:
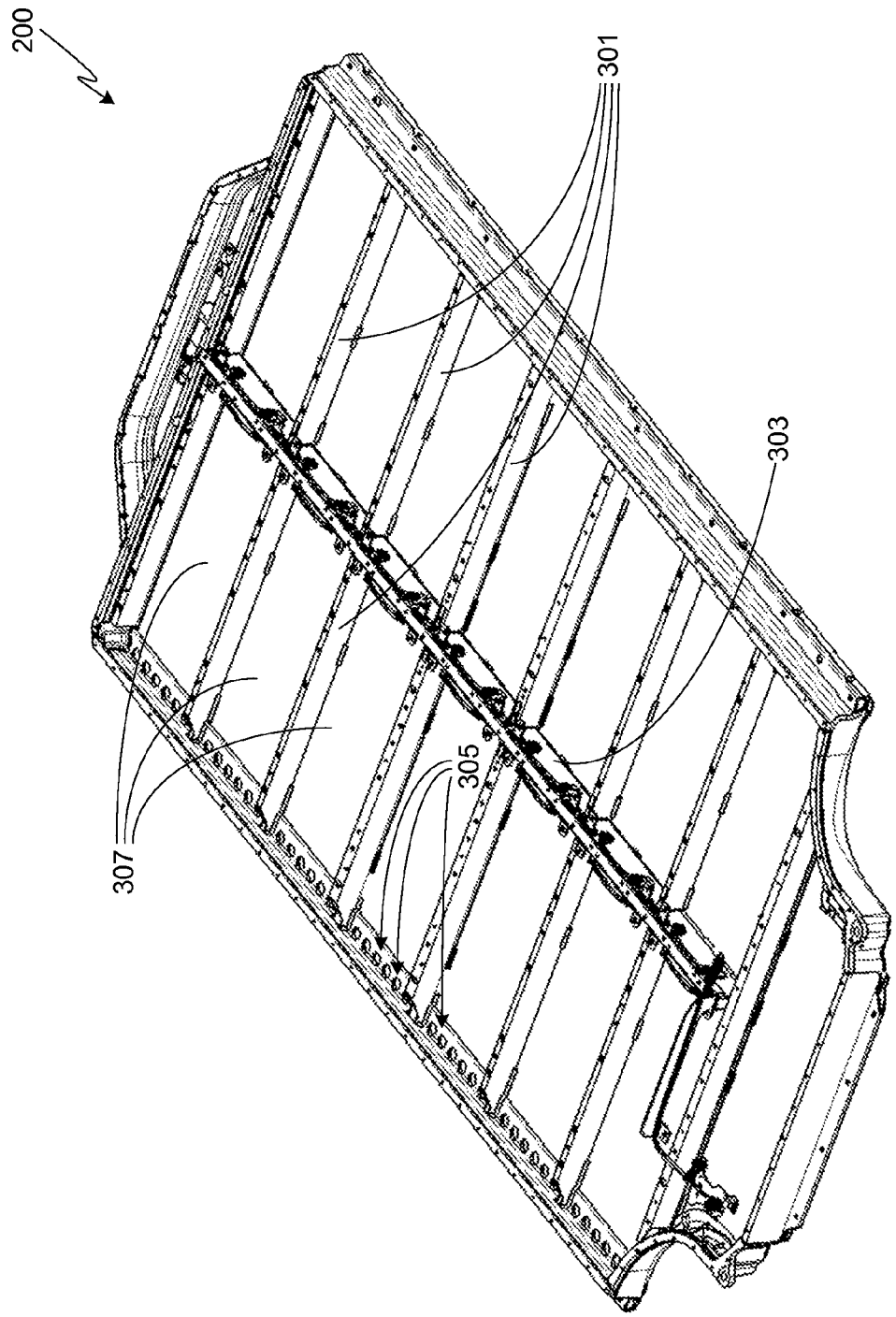
FIG. 3 provides a perspective view of the battery pack shown in FIG. 2, with the top member removed.

FIG. 3 shows battery pack 200 with top member 201 removed. In this view the internal battery pack cross-members 301 are visible as well as the central member 303 and multiple exhaust port/valve assemblies 305. In a preferred embodiment, each battery pack compartment 307 includes 6 exhaust port/valve assemblies 305, where the exhaust port of each has a diameter of approximately 26 millimeters. As shown, member 303 is preferably centered, running lengthwise through the pack and substantially orthogonal to cross-members 301. As previously noted, cross-members 301 and central member 303 segregate the battery pack compartments from one another, thereby limiting event propagation by providing a thermal barrier between groups of cells or battery modules as well as significantly limiting, if not altogether eliminating, gas flow between battery pack compartments 307. Members 301 and 303 also add to battery pack strength and stiffness. Furthermore, assuming that the battery pack is integrated into the vehicle's structure, for example as disclosed in co-pending U.S. patent application Ser. No. 13/308, 300, filed 30 Nov. 2011, members 301/303 and the overall battery pack may be used to improve vehicle performance (e.g., vehicle stiffness, vehicle impact resistance, etc.).

It will be appreciated that there are a variety of ways in which members 301/303 may be designed in order to provide strength and present a thermal barrier between compartments. For example, internal cross-members 301 may be hollow, thus achieving the desired rigidity and strength with minimal weight. In at least one embodiment, members 301 are fabricated from aluminum or an aluminum alloy using an extrusion process. Other materials may also be used (e.g., steel). It will be appreciated that variations on the preferred and illustrated configuration may be used, depending upon both the thermal and mechanical design goals set for the cross-members. For example, rather than utilize a metal, cross-members 301 may be comprised of a high melting temperature, low thermal conductivity material (e.g. a ceramic). Alternately, the lumens within cross-members 301 may be filled with a high melting temperature, low thermal conductivity material (e.g., fiberglass or similar materials). Alternately, the lumens within the cross-members may include a liquid (e.g., water), the liquid being either stagnant or flowing. If stagnant, the liquid may be contained within the lumens themselves or, as preferred, contained within pouches that fit within the lumens. If the liquid is flowing, it is preferably contained within tubing that is inserted within the cross-member lumens and either coupled to a battery cooling system or used in a stand-alone circulation system.

Figure 4:
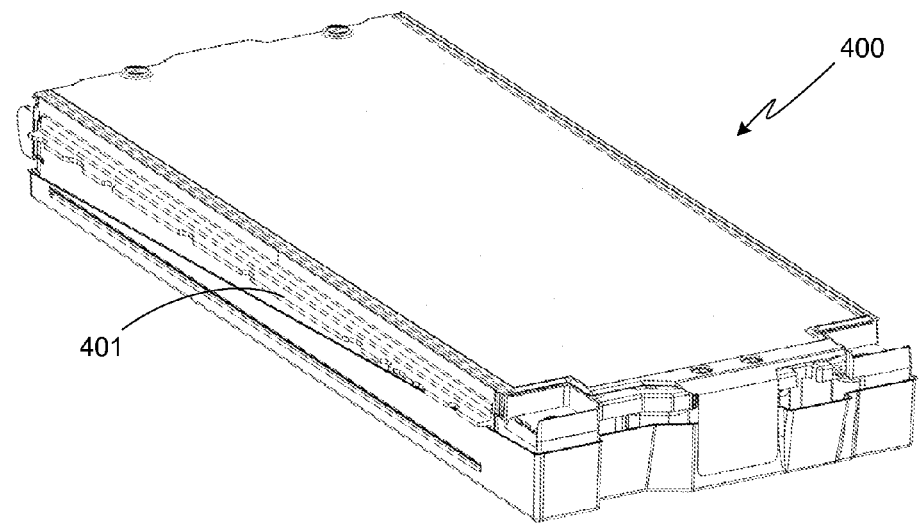
FIG. 4 provides a perspective views of a single battery module for use within a battery pack such as that shown in FIGS. 2 and 3.
Figure 5:
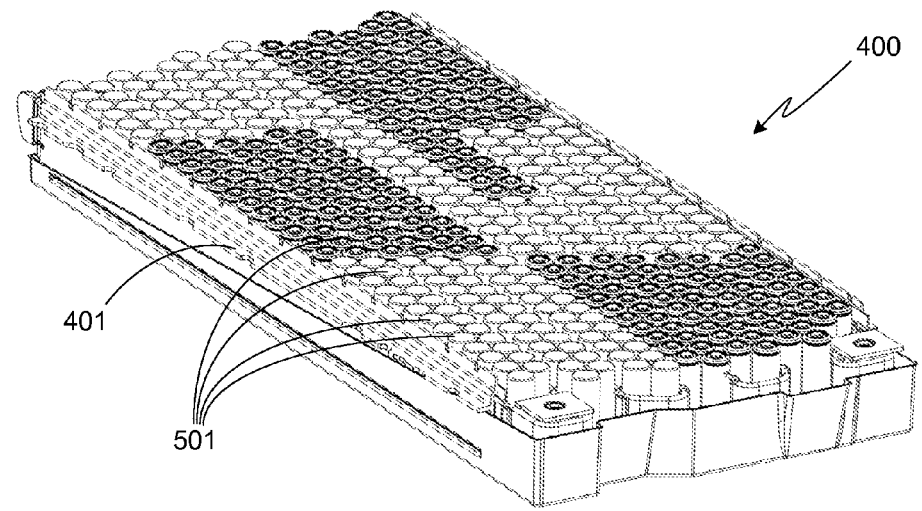
FIG. 5 illustrates the battery module shown in FIG. 4 with the upper module components removed.
Figure 6:
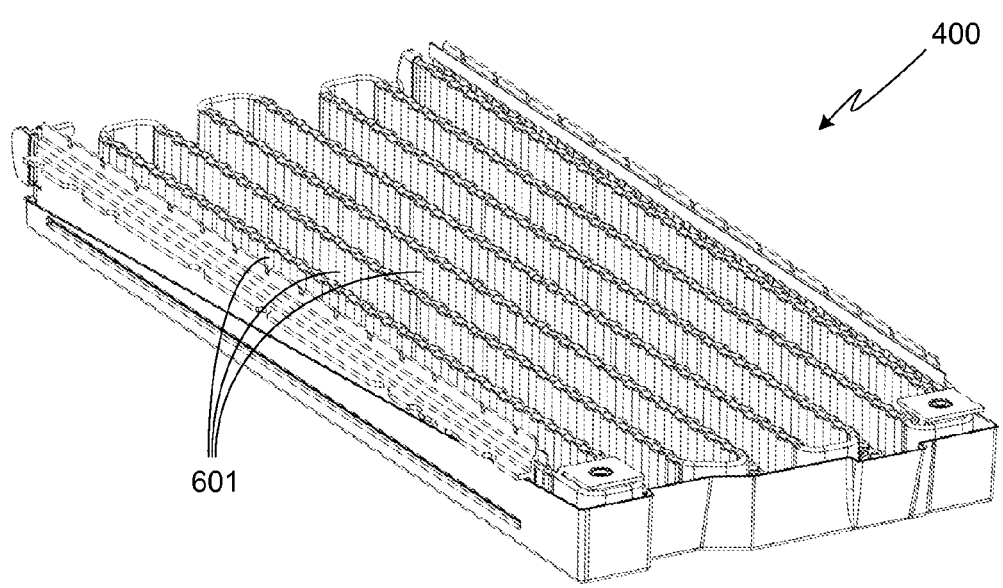
FIG. 6 illustrates the battery module shown in FIGS. 4 and 5 with the batteries removed.

As previously noted, the present invention does not rely on a particular implementation of the battery pack and more specifically, does not rely on a particular implementation of the batteries and battery modules that are contained within the battery pack. Specific implementations are only provided herein to illustrate one preferred configuration. FIG. 4 provides a perspective view of a single module 400, this view highlighting the module mounting flange 401. In this configuration, mounting flanges 401 are located on either side of the module and, during battery pack assembly, are captured between the lower cross-member (e.g., cross-members 301) and an upper cross-member. FIG. 5 shows a different view of battery module 400 in which the upper portion of the module has been removed as well as several of the upper module components (e.g., cell locator plate, current collector plate, etc.). By removing the upper portion of module 400, the individual cells 501 within are visible. Note that the orientation of cells 501 within module 400 varies in the illustrated configuration. In the illustrated embodiment, each module 400 contains 370 individual cells, each cell utilizing an 18650 form factor. It should be understood, however, that this only an exemplary configuration and that the invention may be utilize batteries with a different form factor, a larger or smaller number of cells, different cell chemistries, etc. FIG. 6 provides a similar view to that of FIG. 5, with the exception that cells 501 have been removed. With the removal of cells 501, battery cooling conduits 601 are visible, conduits 601 being coupled to the battery pack thermal management system (not shown).

Figure 7:
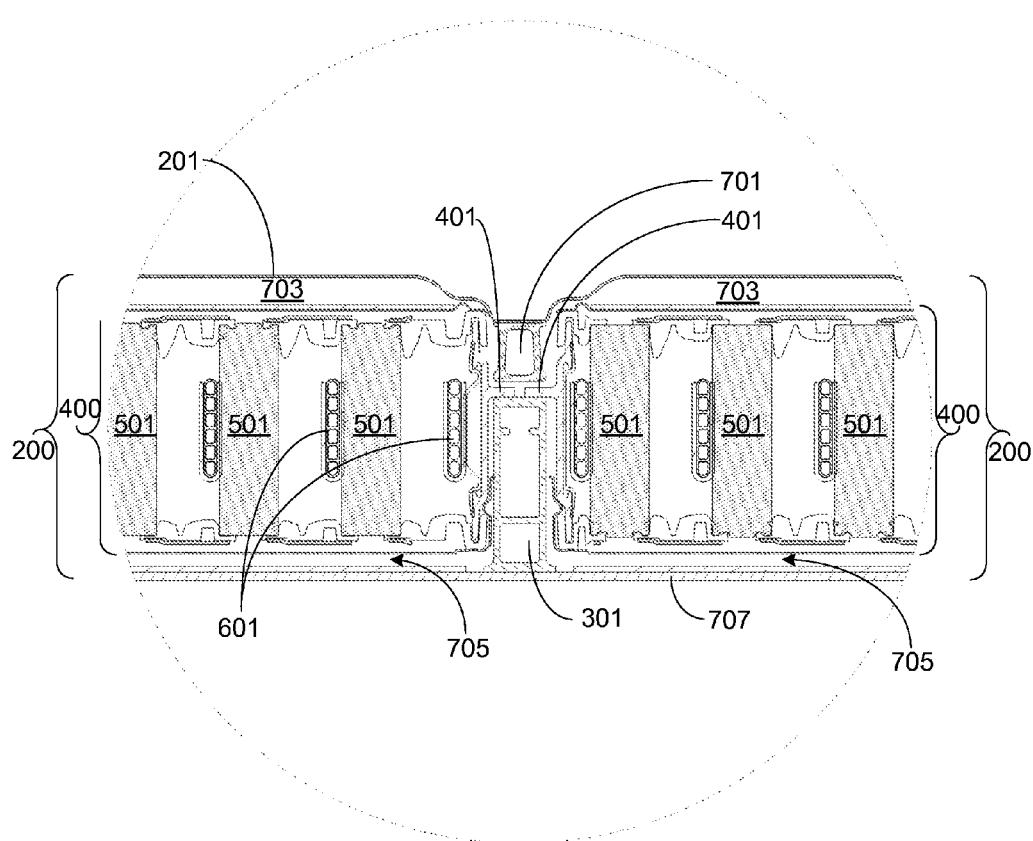
FIG. 7 provides a detailed cross-sectional view of a portion of a battery pack that illustrates gas flow pathways above and below the mounted battery modules.

FIG. 7 provides a detailed cross-sectional view of a portion of battery pack 200, this view illustrating the integration and mounting of modules 400 within pack 200. Note that due to the plane used for purposes of this cross-section, and due to the staggering of batteries in this embodiment as illustrated in FIG. 5, the cells mounted to the left side of each cooling conduit 601 are not visible in this figure. In the illustrated configuration, module mounting flanges 401 are shown captured between lower cross-member 301 and an upper cross-member 701, the upper and lower cross-members providing a simple means of locating and holding the module in place within the battery pack. As a result of this mounting configuration, there is an air space 703 between the modules 400 and battery pack top member 201, and a similar air space 705 between modules 400 and battery pack bottom member 707. The air space above and below the modules insure that regardless of the location of a thermal runaway event, there is a clear pathway to the exhaust port (e.g., ports 305) within the corresponding battery compartment (e.g., compartment 307).

Figure 8:
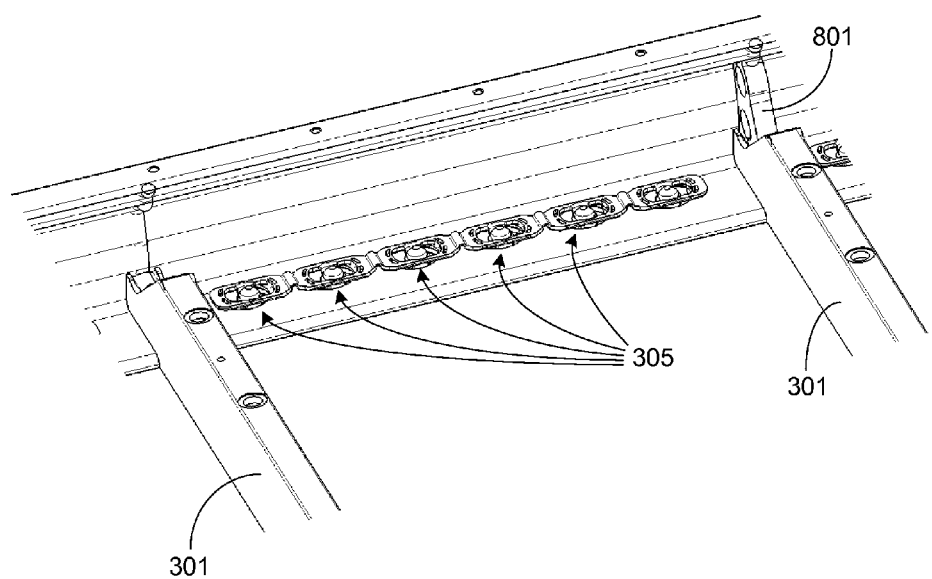
FIG. 8 provides a perspective view of the inside edge of a portion of battery pack in accordance with a preferred embodiment of the invention, this view providing a detailed view of multiple exhaust port assemblies within one of the battery compartments.
Figure 9:
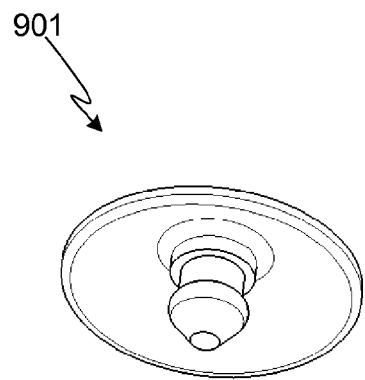
FIG. 9 provides a perspective view of an exhaust port seal.
Figure 10:
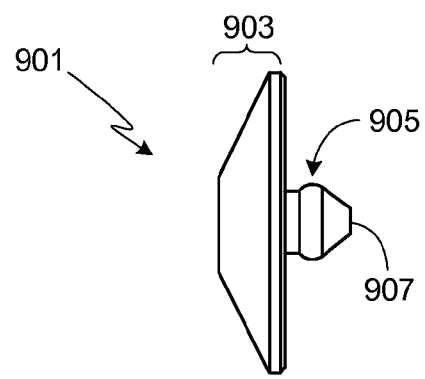
FIG. 10 provides a side view of the exhaust port seal shown in FIG. 9.

FIG. 8 provides a perspective view of the inside edge of a portion of battery pack 200, this view providing a detailed view of the exhaust port assemblies 305 according to a preferred embodiment of the invention. Also visible in this figure is a battery compartment cross-member seal 801 designed to allow passage of a pair of cooling tubes while still maintaining the seal between battery compartments 307. Each exhaust port assembly 305 is comprised of a sealing member 901, also referred to herein as a valve, an umbrella, an umbrella valve, or an exhaust port seal, and a carrier 1101, also referred to herein as a valve retention carrier. FIGS. 9 and 10 provide perspective and side views, respectively, of exhaust port seal 901 while FIG. 11 provides a perspective view of a preferred carrier designed to capture and locate six of the exhaust port seals shown in FIGS. 9 and 10.

Figure 11:
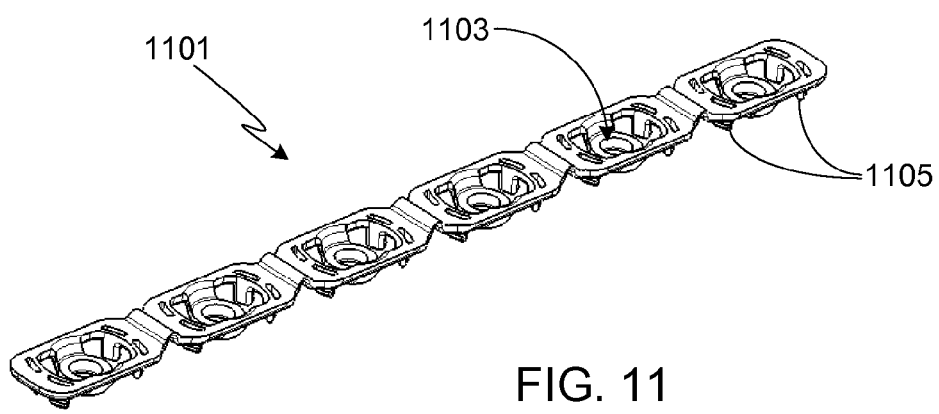
FIG. 11 provides a perspective view of a carrier designed to capture and locate six of the exhaust port seals shown in FIGS. 9 and 10.

In a preferred embodiment, and as illustrated in FIGS. 9-11, each exhaust port assembly is comprised of a sealing member 901 and a means for capturing that seal (i.e., the carrier) within the exhaust port aperture. Preferably the exhaust ports are located on the bottom battery pack surface, near an outer battery pack edge as previously described. During normal use, sealing member 901 is designed to seal the exhaust port aperture, thereby preventing moisture, road debris and other contaminants from entering the battery pack. Preferably member 901 is fabricated from an elastomer that is resistant to solvents, oils and other contaminants, such as fluorosilicone, this and similar materials providing a good seal when compressed against the battery pack sealing surface. Each seal 901 is comprised of an outer umbrella-like portion 903 that may be compressed against the sealing surface (e.g., the lowermost surface of the bottom battery pack panel). Portion 903 has a diameter on the order of 35 millimeters which, assuming an exhaust port diameter of approximately 26 millimeters, is large enough to prevent the umbrella valves from inverting and being pulled into the battery pack during a negative pressure differential. The second portion of each seal 901 includes a barb 905 that is configured to be captured within an aperture 1103 on carrier 1101. Preferably the tip 907 of barb 905 is somewhat pointed, thus allowing it to be easily inserted into carrier aperture 1103. In the preferred embodiment, carrier 1101 is fabricated from a polypropylene or other plastic.

In the illustrated embodiment, umbrella seal 901 is designed to be inserted through the bottom of battery pack 200 and through aperture 1103 of carrier 1101. During battery pack assembly, carrier 1101 is inserted into the upper surface of the bottom battery pack panel, i.e., within the inside of the battery pack. Although carrier 1101 may be bonded to the bottom battery pack panel, preferably the undersurface of carrier 1101 includes a plurality of snap-fit features 1105 that center each aperture 1103 within the corresponding exhaust port aperture and hold the carrier in place until barb 905 of sealing member 901 is inserted into carrier aperture 1103. In the illustrated embodiment, each snap-fit feature 1105 is comprised of a ridged, bendable protrusion.

Figure 12A:
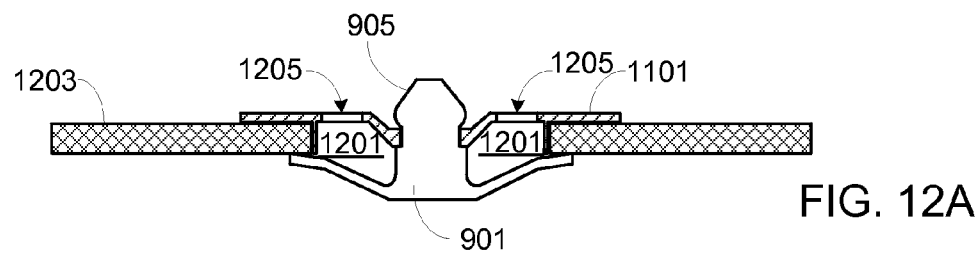
FIGS. 12A-12D illustrate the various venting stages of the seal/carrier arrangement illustrated in FIGS. 9-11.
Figure 12B:
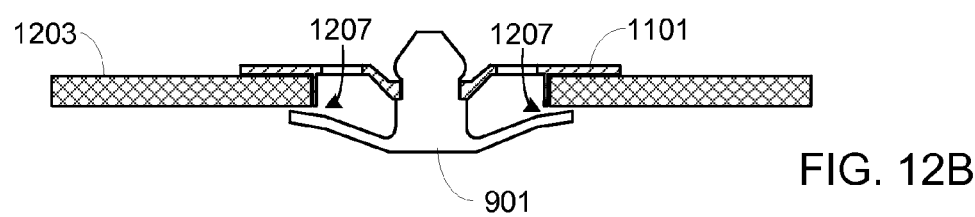
Figure 12C:
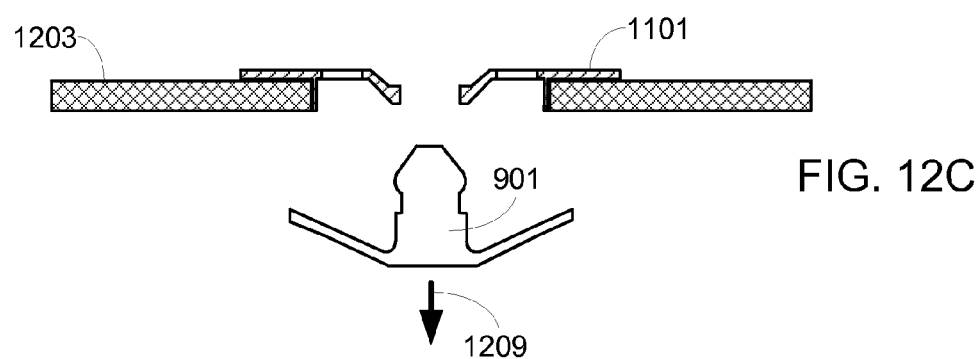
Figure 12D:

FIGS. 12A-12D schematically illustrate the four primary stages of battery pack venting. FIG. 12A shows sealing member 901 positioned within exhaust port 1201 of battery pack bottom panel 1203. Barb 905 is captured within the aperture of carrier 1101. Note that carrier 1101 includes multiple air pathways as shown in FIG. 11, and represented by regions 1205 in FIG. 12A, that insure that umbrella seal 901 is exposed to internal battery pack pressure variations. FIG. 12B illustrates the response of seal 901 to minor pressure increases within the battery pack. In at least one preferred embodiment, seals 901 are configured to allow air flow starting at a pressure differential between the affected battery pack compartment and ambient of 0.7 psi. At the seal's crack pressure (e.g., 0.7 psi), flexible seal 901 expands slightly out of the exhaust port 1201, thereby allowing air to flow out of the pack along pathways 1207. If the pressure then equilibrates, for example as would be expected if the pressure increase was a transient event, then umbrella valve 901 would reseal, i.e., return to the state shown in FIG. 12A. If, on the other hand, the change in pressure is due to the initial stage of a thermal runaway event, then the internal battery compartment pressure will continue to increase, often accompanied by pressure spikes, which will often lead to seal 901 being pushed completely out of the pack along pathway 1209 as shown in FIG. 12C. As hot gas and material flow through the exhaust port, carrier 1101 melts (or ignites) and is pushed out of, or otherwise deflected away from, the exhaust port (represented by FIG. 12D), thereby increasing the flow path for exhausting thermal runaway hot gas and material from the affected battery pack compartment. Accordingly, in a typical thermal runaway event, the preferred embodiment of the present invention provides a three stage vent, wherein during the first stage the seal opens, during the second stage the seal is ejected from the port, and during the third stage both the umbrella valve and the carrier are ejected or otherwise eliminated (e.g., deflected/melted/burnt up) in order to further increase the exhaust flow path.

Figure 13:
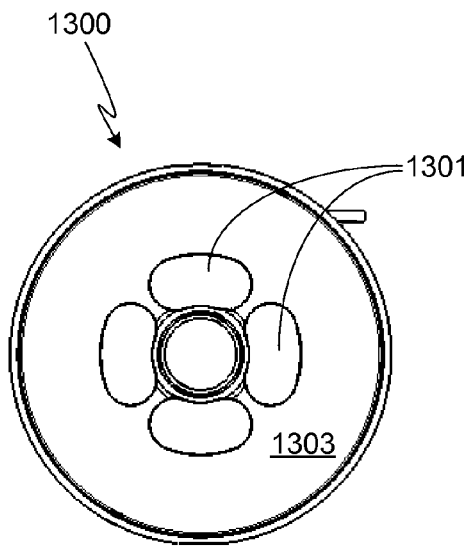
FIG. 13 provides a top view of an alternate carrier.
Figure 14:
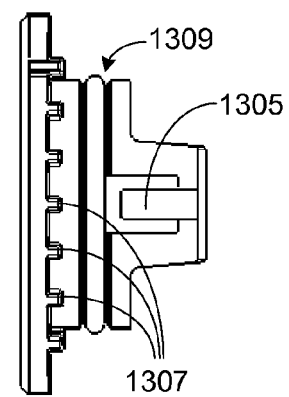
FIG. 14 provides a side view of the carrier shown in FIG. 13.
Figure 15:
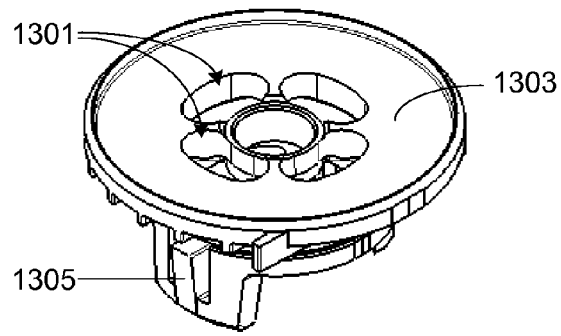
FIG. 15 provides a perspective view of the carrier shown in FIGS. 13 and 14.

It will be appreciated that the present invention is not limited to the specific valve and carrier arrangement described above relative to FIGS. 9-11. For example, FIGS. 13-15 provide top, side and perspective views of an alternate seal carrier 1300 that is designed to be installed into the battery pack exhaust ports (e.g., ports 1201) from outside of the pack and to utilize an umbrella sealing member 901. As shown in FIGS. 13 and 15, carrier 1300 includes multiple apertures 1301 that insure that the sealing member, not shown in these figures, is subjected to the battery pack pressure variations. The upper, outside surface 1303 of carrier 1301 provides a smooth sealing surface for umbrella seal 901. Similar to carrier 1101, seal carrier 1300 utilizes multiple snap-fit features 1305 to mount the carrier into the battery pack exhaust port (e.g., port 1201). In this carrier design, the battery pack enclosure wall (e.g., bottom panel) is captured between snap-fit features 1305 and a plurality of features 1307, e.g., ridges, located on the rear surface of the front portion of the carrier as shown. Note that carrier 1300 is preferably sealed into the battery housing using an o-ring 1309, although other techniques may be used (e.g., sealants, adhesives, etc.).

Carrier 1300 offers several advantages over carrier 1101. First, as carrier 1300 is not inserted from inside of the pack, carrier installation is simplified, allowing seal and carrier to be simultaneously installed from outside of the pack. Second, during the second stage of venting, only the snap-fit features must melt before the carrier can be completely ejected, leading to a rapid opening of the battery pack exhaust port. Third, it is easier to achieve a seal with surface 1303 of carrier 1300 than it is with the bottom surface of the battery pack enclosure as required when carrier 1101 is used.

Figure 16:
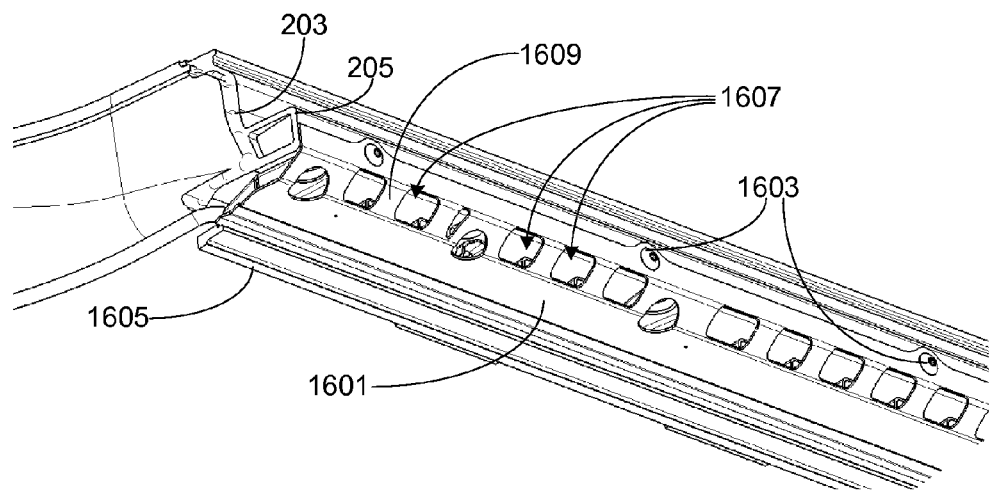
FIG. 16 provides a perspective view of a preferred exhaust guide mounted underneath the battery pack.
Figure 17:
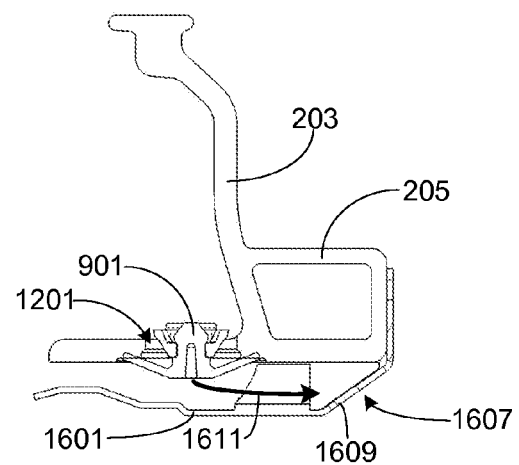
FIG. 17 provides a cross-sectional view of the exhaust guide shown in FIG. 16, this view illustrating the relative positions of the exhaust guide and battery pack exhaust port.

As previously noted, the intent of the present invention is to insure that during a thermal runaway event, hot gas and debris are ejected away from the battery pack and the vehicle, thereby helping to minimize collateral damage from the event and prevent event propagation throughout the rest of the pack. Accordingly, in a preferred embodiment of the invention an exhaust guide, preferably fabricated using 1.5 to 2 millimeter stamped low carbon steel, is mounted under the battery pack. FIG. 16 provides a perspective view of a preferred exhaust guide 1601 mounted underneath the battery pack. FIG. 17 provides a cross-sectional view of guide 1601, this view illustrating the position of the exhaust guide relative to the battery pack exhaust port and sealing assembly.

As shown in FIG. 16, exhaust guide 1601 is attached to the outer portion of the battery pack with a plurality of bolts 1603, and is preferably mounted between lip 205 of battery pack side structure 203 and a grooved mounting member 1605 coupled to the undercarriage of the vehicle or battery pack. Exhaust guide 1601 includes a plurality of exhaust ports 1607 that are preferably located along the outer edge of guide 1601, and located some distance outboard of the battery pack exhaust ports 1201. Each guide port 1601 is preferably on the order of 20 millimeters by 27 millimeters. Preferably the surface 1609 that includes exhaust ports 1607 is angled downwards as shown, with an angle of between 30 and 60 degrees, and more preferably at around 45 degrees, off vertical. The use of an exhaust guide with angled guide ports that are located outboard of the battery exhaust ports helps to direct the flow of hot gas and debris generated during thermal runaway along a pathway 1611 that is away from the vehicle and in a downwards direction towards the road. A second benefit of locating the guide ports away from the battery exhaust ports is that seals 901 are protected from accidental damage and abuse, for example due to road debris or other road hazards, that might otherwise occur.

It will be appreciated that while the description and figures provided above describe a preferred embodiment, the inventors envision that other configurations may employ the same concepts as a means of controlling the flow of hot gas generated during a thermal event occurring within a battery pack. The specifics of the present configuration are clearly due, at least in part, on the size of the battery pack, the location of the battery pack within the vehicle, and the location of the battery pack relative to the passenger compartment, drive train components, and other vehicle structures. Therefore, depending upon the design of the vehicle or other application for which the battery pack is intended as well as the specifics of the battery pack itself, the present invention may be embodied in other specific forms without departing from the spirit or essential characteristics thereof. Accordingly, the disclosures and descriptions herein are intended to be illustrative, but not limiting, of the scope of the invention which is set forth in the following claims.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention

What is claimed is:

1. A battery pack thermal management system, comprising:
   a sealed battery pack enclosure configured to hold a plurality of batteries, wherein said sealed battery pack enclosure is divided into a plurality of sealed battery pack compartments, and wherein said plurality of batteries are divided among said plurality of sealed battery pack compartments;
   a plurality of battery venting assemblies, wherein at least one of said plurality of battery venting assemblies is integrated into each of said plurality of sealed battery pack compartments, and wherein each of said plurality of battery venting assemblies is comprised of:
   an exhaust port integrated into an outer wall of said sealed battery pack compartment; and
   a valve, said valve configured to seal said exhaust port under normal operating conditions and unseal said exhaust port when at least one battery contained within said sealed battery pack compartment enters into thermal runaway, wherein each of said plurality of battery venting assemblies is further comprised of a valve retention carrier, wherein a first portion of said valve is comprised of an exhaust port sealing member, and wherein a second portion of said valve is comprised of a retention member configured to be captured by a valve retention aperture of said valve retention carrier.

2. The battery pack thermal management system of claim 1, wherein said first portion of said valve is umbrella shaped and wherein said second portion of said valve is further comprised of a barbed member configured to be captured by a valve retention carrier aperture of said valve retention carrier.

3. The battery pack thermal management system of claim 1, wherein said valve retention carrier is configured to capture said retention member of multiple valves, said multiple valves corresponding to multiple exhaust ports integrated into said sealed battery pack compartment.

4. The battery pack thermal management system of claim 1, wherein said valve retention carrier is further comprised of a plurality of snap-fit features configured to hold said valve retention carrier in said exhaust port.

5. The battery pack thermal management system of claim 4, wherein said valve retention carrier is mounted to an inside surface of said outer wall of said sealed battery pack compartment, and wherein said exhaust port sealing member of said first portion of said valve seals against an outside surface of said outer wall of said sealed battery pack compartment.

6. The battery pack thermal management system of claim 4, wherein said valve retention carrier is mounted to an outside surface of said outer wall of said sealed battery pack compartment, and wherein said exhaust port sealing member of said first portion of said valve seals against an outer surface of said valve retention carrier.

7. The battery pack thermal management system of claim 6, wherein said valve retention carrier is sealed within said exhaust port.

8. The battery pack thermal management system of claim 6, wherein said valve retention carrier further comprises an o-ring, wherein said o-ring seals said valve retention carrier within said exhaust port.

9. The battery pack thermal management system of claim 1, wherein said valve retention carrier is fabricated from a plastic material.

10. The battery pack thermal management system of claim 1, wherein said valve is fabricated from an elastomeric material.

11. The battery pack thermal management system of claim 1, wherein said valve is fabricated from a fluorosilicone.

12. The battery pack thermal management system of claim 1, wherein said outer wall of said sealed battery pack compartment corresponds to a bottom battery pack enclosure panel.

13. The battery pack thermal management system of claim 1, further comprising an exhaust guide, wherein said exhaust guide is mounted below and external to said sealed battery pack enclosure, wherein said exhaust guide is spaced apart from said exhaust port, and wherein said exhaust guide is configured to direct hot gas and material expelled from within said battery pack compartment to an ambient environment during thermal runaway.

14. The battery pack thermal management system of claim 13, wherein said exhaust guide is configured to direct said hot gas and material expelled from within said battery pack compartment in a direction away from a vehicle centerline during thermal runaway, wherein said vehicle centerline corresponds to a vehicle, wherein said sealed battery pack enclosure is incorporated into said vehicle.

15. The battery pack thermal management system of claim 13, wherein said exhaust guide is comprised of a plurality of exhaust ports, wherein said plurality of exhaust ports are located outboard of said plurality of battery venting assemblies, and wherein said plurality of exhaust ports of said exhaust guide are configured to direct said hot gas and material expelled from within said battery pack compartment in a direction away from a vehicle incorporating said sealed battery pack enclosure.

16. The battery pack thermal management system of claim 15, wherein said plurality of exhaust ports of said exhaust guide are angled away from normal at an angle of between 30 and 60 degrees.

17. The battery pack thermal management system of claim 13, wherein said exhaust guide is fabricated from low carbon steel.

18. The battery pack thermal management system of claim 1, wherein said valve has a cracking pressure in the range of 0.5 to 1.0 psi.

19. The battery pack thermal management system of claim 1, said sealed battery pack enclosure further comprising at least one two-way pressure equalization valve, wherein said two-way pressure equalization valve has a first cracking pressure and said valve of said battery venting assembly has a second cracking pressure, wherein said first cracking pressure is less than said second cracking pressure.

20. The battery pack thermal management system of claim 1, said sealed battery pack enclosure further comprising a plurality of cross-members integrated within said sealed battery pack enclosure, said plurality of cross-members dividing said sealed battery pack enclosure into said plurality of sealed battery pack compartments, and wherein each of said plurality of cross-members presents a thermal barrier to the transfer of thermal energy between said sealed battery pack compartments.

21. The battery pack thermal management system of claim 1, said sealed battery pack enclosure further comprising a central battery pack member and a plurality of cross-members integrated within said sealed battery pack enclosure, wherein said central battery pack member and said plurality of cross-members divide said sealed battery pack enclosure into said plurality of sealed battery pack compartments, and wherein said central battery pack member and each of said plurality of cross-members presents a thermal barrier to the transfer of thermal energy between said sealed battery pack compartments.

* * * * *